Nov. 21, 1944.   S. T. BODNAR ET AL   2,362,983
CONDUIT CONNECTION FOR ENAMELED TANKS
Filed Feb. 14, 1942   3 Sheets-Sheet 1
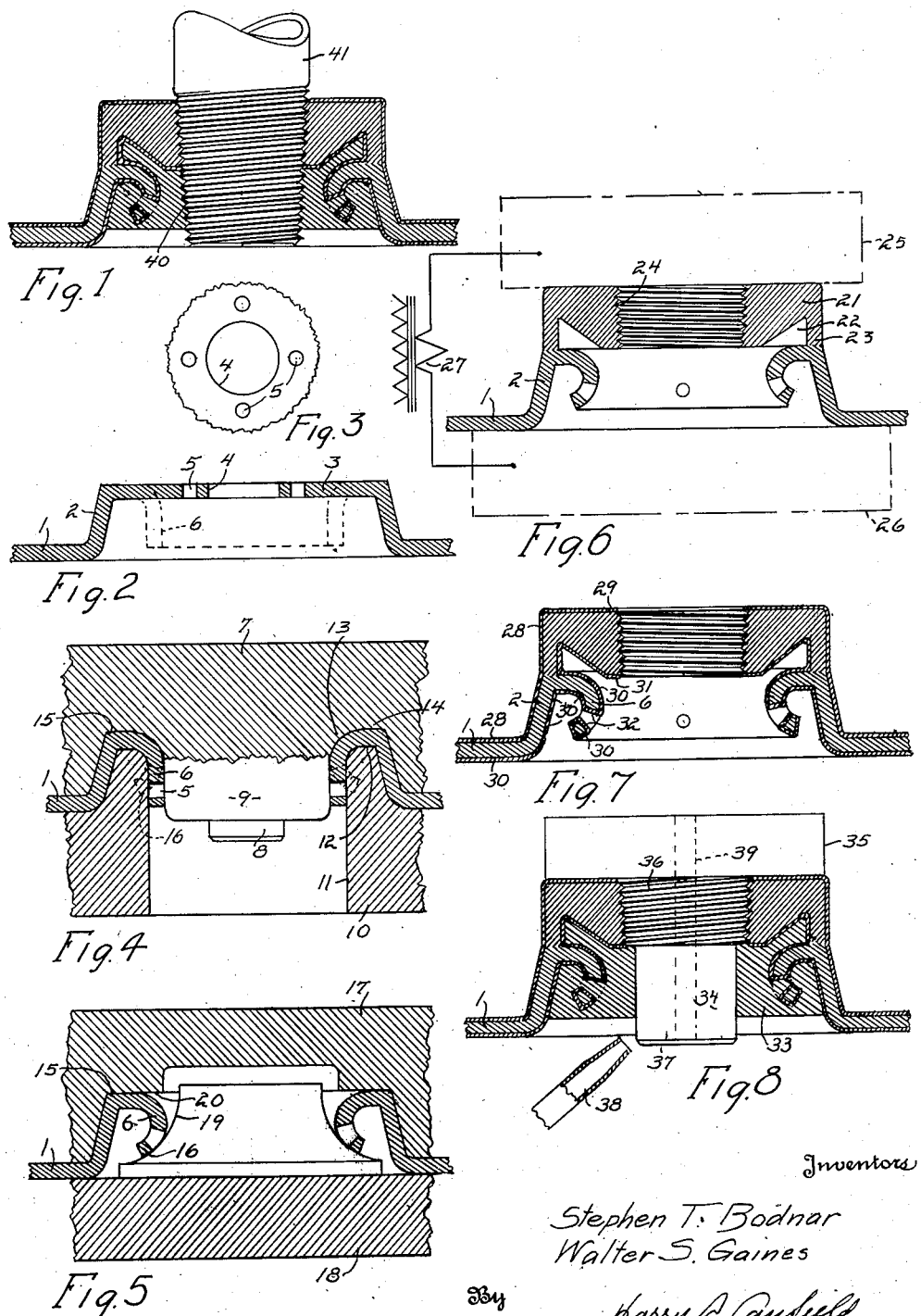
Inventors
Stephen T. Bodnar
Walter S. Gaines
By Harry P. Canfield
Attorney Nov. 21, 1944.    S. T. BODNAR ET AL    2,362,983
CONDUIT CONNECTION FOR ENAMELED TANKS
Filed Feb. 14, 1942    3 Sheets-Sheet 3

INVENTORS.
Stephen T. Bodnar
Walter S. Gaines
BY  Harry C. Canfield
ATTORNEY.

Patented Nov. 21, 1944

2,362,983

BEST AVAILABLE COPY

UNITED STATES PATENT OFFICE 2,362,983

CONDUIT CONNECTION FOR ENAMELED TANKS

Stephen T. Bodnar, Cleveland, and Walter S. Gaines, Chagrin Falls, Ohio, assignors to Porcelain Steels, Inc., Cleveland, Ohio, a corporation of Ohio Application February 14, 1942, Serial No. 430,850

10 Claims. (Cl. 285—49)

This invention relates to the art of making connection between a conduit, pipe, or the like and a tank, box, vat or other vessel.

In the various arts, when a conduit is threadedly connected to the wall of a vessel, the thickness of the wall is often less than the necessary axial extent of the threads, and a so-called "spud" of suitable thickness is provided, either integral with and a part of the vessel wall or attached to it, and having threads to receive the conduit.

Also, vessels often contain material, for example, liquid, which is corrosive with respect to the vessel wall and spud, and the wall and spud are accordingly painted or otherwise coated with a non-corrosive coat; the coat being continuous from the wall of the vessel outwardly over the spud wall and out to the conduit-receiving spud threads. But it is generally impracticable to insure that the non-corrosive coat will extend uninterruptedly entirely to the threads, or that the threads themselves will be so tightly sealed as to prevent corrosive liquid from entering them. It follows that such coats fail of their main purpose of preventing access of the corrosive liquid to bare metal, because bare metal is exposed to its action either on the threads themselves or on the spud surfaces adjacent the threads.

The present invention has been made to solve this problem generally, and, in particular, to provide a solution applicable to the attachment of conduits to vessels, the walls of which are coated with vitreous enamel, typical of which are the enameled hot water tanks used to supply hot water to a domestic or like water system.

It is desirable, in enameled tank fabrication, to attach separately formed spuds to the tank wall, and it is known that this can most advantageously be done by electric resistance or electric flash welding; but the attachment of spuds to tanks of the enamel-coated class, in a leak-proof and pressure-proof manner, introduces problems the solution of which is not obvious and many attempts have been made to provide a satisfactory spud and means of attaching it to the tank wall in such cases.

Some structure, means or method must be provided to insure that the enamel coat, particularly on the inside of the tank, will form solidly and completely over the spud surfaces and tank wall surfaces adjacent thereto, and not leave bare metal exposed to the corrosive action of the hot water or other contents of the tank; and the threads of the spud must be left free from enamel slip so that fused enamel will not form thereon; and in this connection the spud must be attached to the tank wall in such manner that the enameling of the tank and the surfaces of the spud may be performed after the spud is attached; and the outside diameter of the spud and its zone of connection with the tank wall must be relatively large because when a conduit has been connected to it, the conduit is in the nature of a lever and even a slight side thrust thereon which may inadvertently be given to it by the plumber installing it, will, because of the leverage, bend the wall to which the spud is attached and crack the enamel coat, but at the same time, the mass of metal in the spud at such large outside diameter must not interfere with the welding of it to the relatively thin wall of the tank; and at the juncture of the spud with the tank wall, all surfaces that are to be enameled must either be planar or must be curved on sufficiently great radii as to cause the enamel to form continuously and solidly, and such surfaces should preferably be inherent in the structure so as not to require reaming or grinding or rounding metal-working operations.

The invention comprises in general, besides the spud proper or thickened portion of the vessel wall having threads into which the threaded conduit is screwed, a non-corrosive insert formed of such material as to render it susceptible of being molded into intimate sealing engagement with the non-corrosive coat of the vessel or spud to seal off the non-corrosive coat on an unbroken area of the coat and inwardly of the spud threads; and which is also susceptible of having supplemental threads formed thereon after it is assembled with the threaded spud which supplemental threads are in continuation with the spud threads and into which also the conduit is screwed and which seal off the conduit threads inwardly of the spud threads. Thus no corrodible part of the vessel is exposed to corrosive contents of the vessel except the inner end of the conduit itself and if desired it also can be made of corrosion-proof material.

It is among the objects of the invention:

To provide generally an improved conduit connection for tanks, and other vessels;

To provide generally an improved connection for joining a conduit to a coated vessel in communication with its interior;

To provide a spud connection for vessels of the type comprising a threaded conduit receiving spud welded to the vessel wall and in which both the spud and the vessel wall may be coated completely and solidly with enamel;

To provide a conduit spud connector of relatively large diameter which may be welded to a vessel wall on a small welding area in an improved manner;

To provide in a conduit connection for enameled vessels an improved construction whereby at the juncture of the spud and vessel wall, surfaces of large radius may be provided in an improved manner to insure the formation thereon of a solid coat of enamel;

To provide a conduit connection for vessels having corrosion-proof coated walls, comprising an insert element for effecting in an improved manner the sealing-off of the inner coat of the vessel and the sealing off of the conduit threads;

To provide an improved method for making a welded juncture between a spud and a tank wall to facilitate the coating of the spud and the tank wall;

To provide a threaded conduit connection for vessels having corrosion-proof coated walls and comprising a conduit receiving threaded steel spud and an insert element molded into the connection for sealing off the inner coat of the vessel and the conduit threads and which may be threaded in continuation with the threads of the spud after it is interlockingly molded into the connection to prevent its displacement, and to prevent it from turning in the connection while being threaded, or while a conduit is being screwed into or out of it;

To provide an improved method for making a spud or like conduit connection for an enamel-coated tank or other vessel.

Other objects will be apparent to those skilled in the art to which our invention appertains.

Our invention is fully disclosed in the following description taken in connection with the accompanying drawings in which, Fig. 1 illustrates an embodiment of our invention in completed form and with a conduit connected therewith;

Figs. 2 to 8 inclusive are views illustrating steps of the process of making the embodiment of Fig. 1;

Figure 22:
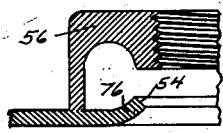
Figure 23:
Figure 24:
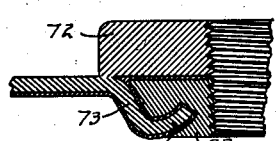
Figure 21:
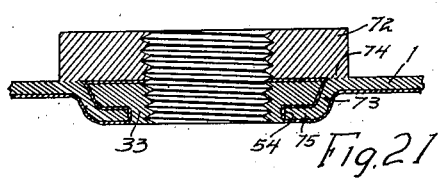
Fig. 21 is a view illustrating another embodiment of the invention.

Figs. 22 and 23 are views similar respectively to views 15 and 16 illustrating a modification;

Fig. 24 is a view similar to Fig. 21 illustrating a modification.

While the present invention may be applied, to advantage, to vessels of various kinds, it will be described more particularly herein as applied to enamel coated tanks, to which separately formed spuds are attached; inasmuch as this is one of its more important uses. The invention has been illustrated with tank walls coated both inside and outside with enamel but as will become apparent hereinafter the outside enamel coat may be omitted if desired. The inside enamel coat of the tank is provided primarily for the purpose of preventing corrosion of the tank wall by the contends of the tank. Typical of such tanks are the hot water tanks used as reservoirs for hot water in domestic water systems, and as is well known the hot water has corrosive action on the walls of the tank when for purposes of economy they are made from steel. Commerce demands a conventional form of tank comprising a cylindrical tubular body, and heads at the ends of the body, and spuds for conduit connections to the tank are provided at various points on the body wall and on the heads. The spud connection herein described may be applied either to the body wall or to the head walls and for simplicity of illustration herein we have chosen to illustrate it in connection with the body wall and in connection with a tank the walls of which are made of steel.

Referring to the drawings, particularly Figs. 1 to 8 inclusive, at 1 is represented a fragment of any one of the steel walls of a tank. At the beginning of the process of making the complete spud connection of Fig. 1, the wall 1, as shown in Fig. 2 has a generally cup-form protuberance 2 pressed outwardly (or inwardly) from the wall by a press and dies which may be of well-known construction, the bottom 3 of the cup being preferably flat or planar, whereas the wall 1 itself at the zone of the protuberance may be of curved form. A perforation 4 is provided in the bottom 3 of the protuberance. A plurality of perforations 5—5 are also provided in the bottom 3 preferably in a series surrounding the perforation 4, although in some cases only one or two perforations 5 may suffice.

A metal working operation is then performed on the metal of the bottom 3 to form the metal surrounding the perforation 4 into an inwardly projecting annular flange 6, shown in dotted lines in Fig. 2, and this may be performed by a press and dies as shown in Fig. 4.

An upper die 7 has a pilot portion 8 which, as the upper die 7 descends, enters the perforation 4 as a centering guide; and has a cylindrical portion 9 larger than the perforation 4 which bends the metal inwardly. The upper die 7 and the lower die 10 have annular surfaces 11, 12, 13, 14 which, as the dies 9 and 10 approach each other, form the flange 6 while retaining otherwise the form of the protuberance, and leave a planar annular surface 15 on the protuberance.

The annular flange 6 is then flared outwardly as indicated in dotted line at 16 in Fig. 4 and this metal working operation may be performed by dies 17 and 18 as shown in Fig. 5. The lower die 18 has a concavo-conical die portion 19 which, as the dies 17 and 18 approach each other, bends or rolls the flange 6 to flare its open end outwardly as shown at 16, and the upper die 17 has a face 20 which preserves the planar face 15.

A spud element 21, Fig. 6, is made, preferably of steel, and, as shown it is generally in the form of a thick disc having as at 22 an annular groove in its lower face which provides an annular skirt 23. The spud is threaded as at 24 with preferably pipe or taper threads.

The skirt 23 is of approximately the same thickness and diameter as the width and diameter of the above mentioned annular planar surface 15 on the protuberance 21 and is now placed thereon as shown in Fig. 6 and welded thereto preferably by electric resistance welding, which welding operation may be performed by well-known means, for example by an electrode 25 and an electrode 26 disposed respectively upon the spud 21 and upon the opposite side of the tank wall 1 and engaging the parts to be welded with pressure while electric current is caused to flow therethrough from a welding transformer 27.

After this weld has been made, the parts will appear as shown in Fig. 6 wherein the spud 21 is now integral with the protuberance 2 and wall 1.

As many spuds 21 as may be wanted are in this manner joined to corresponding protuberances 2 on the tank. At the time of enameling the walls proper of the tank, the spud structure as thus far described is also coated with enamel, either inside or both inside and outside, Fig. 7 illustrating the enamel coat on both the inside and outside.

As shown, enamel 28 on one side continues from the tank wall over the protuberance, and to and over the spud, and as at 29 to the threads 24; and enamel 30 on the other side continues over the protuberance 2 and over the flaring flange 6 and over the surfaces of the annular groove 22 in the spud, and, as at 31, to the threads 24; the enamel preferably also covering the peripheries of the perforations 5 as shown at 32.

Referring now to Fig. 8 a metal insert 33 is made in the structure, by melting the metal and pouring it into the structure and allowing it to solidify, thereby molding it in the structure. In molding this insert in position, it is contemplated that it will subsequently be threaded, and to avoid having to drill or bore a hole therethrough for threading purposes, a hole 34 is molded or cast in the metal by means of a plug 35 having a threaded portion 36 screwed into the said threads 24 and a cylindrical or slightly tapered portion 35 beyond the threads.

The molten metal may be poured into the cavity of the structure by turning it upside down with respect to the position of Fig. 8 and conducting the molten metal to it through a tube or pipe 38; or the molten metal may be introduced through a bore 39 in the plug through which it flows and over the end of the portion 37 and thence into the cavity. The molten metal fills all of the interstices of the cavity including the perforations 5 and is thereby after it has solidified, rigidly interlocked with the structure.

Any suitable metal or alloy for the insert may be employed, one such alloy being equal parts of tin and lead. Other alloys may be utilized; and a metal alloy which expands upon solidifying may be employed if desired, such alloys being well-known in the art. The alloy in any case is preferably one which has no chemical reaction with the enamel coat in engagement with it.

The metal plug 35 is removed by unscrewing it and the hole 34 left by the portion 37 of the plug is threaded with a thread which is a continuation of the thread 24 of the spud 21, and this is preferably performed by screwing a threading tap into and beyond the threads 24 and cutting threads on the insert, such latter threads being shown at 40, Fig. 1.

The spud connection is now complete as shown in Fig. 1, and a conduit such as that shown at 41, Fig. 1 may be screwed thereto and will make leak-proof and pressure-proof juncture with the insert 33, or with the insert and the spud 21 itself, on the continuous threads thereof. The insert 33 being rigidly interlocked with the cavity of the structure by the re-entrant configuration thereof as shown, there is no possibility that it can be displaced outwardly axially from the cavity; and being interlocked with the perforations 5, there is no possibility that it will rotate while being threaded, whereby its thread is certain to be a perfect and permanent continuation of the spud thread; and furthermore there is no possibility that it will rotate and become loose or mutilate the thread when the conduit is screwed into it or when, if such case should arise, it is screwed out of it.

The insert besides performing the function of making a pressure and liquid tight seal at its threads performs another important sealing function. The metal of the insert being molded and solidified on the enamel on the inside of the protuberance 2 and all portions of the flange 6 and all the way to the thread 24, makes intimate sealing contact therewith and prevents corrosive liquid or the like, even if under pressure, from creeping over the enamel to the thread 24, even if in fact the enamel coat does extend all of the way to the thread.

In this connection it will be understood that it is desirable that there be no enamel on the thread 24 of the spud, and preferably precautions are taken to avoid it. In forming the enamel coat, wet enamel slip is first applied and then dried and then fused; and after drying the slip, if any of its happens to be on the thread, it is removed therefrom before firing; but it is impracticable to insure that the enamel coat will extend exactly to the thread and stop there, so that without the insert 33, when the conduit 41 has been screwed into the spud body 21, there would inevitably be bare metal exposed on the spud adjacent the thread 24 which would be attacked by the corrosive liquid; but by employing the insert 33, even if there be bare metal at such point, the liquid cannot reach it, being sealed off therefrom by the insert. The metal of the insert 33 itself is not subject to corrosion by the liquid in the tank if a suitable alloy be employed therefor and as would be the case with the alloys mentioned above.

It follows that with the spud structure above-described, after the conduit has been screwed thereinto, no bare corrodible metal is exposed to the action of liquid in the tank except that of the conduit itself, if it be of corrodible material, and to render the entire system corrosion-proof, the conduit 41 may be of non-corrodible metal such as is well-known for such purposes.

It will be observed also that the outside diameter of the spud structure as a whole, which is the outside diameter of the protuberance 2 (and which diameter may be made as large as desired), is a relatively large diameter and therefore mechanically rigid and strong so that lateral thrusts on the conduit 41 which will inevitably be exerted thereon by a plumber installing the conduit in the spud connection, will not bend the spud connection at its juncture with the tank wall and consequently will not crack the enamel coat.

Figure 9:
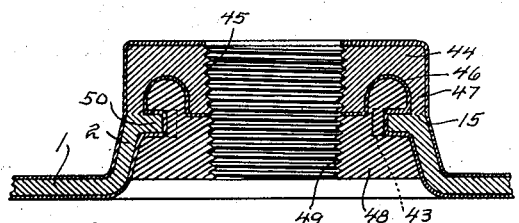
Fig. 9 is a view illustrating in completed form another embodiment of our invention.
Figure 11:
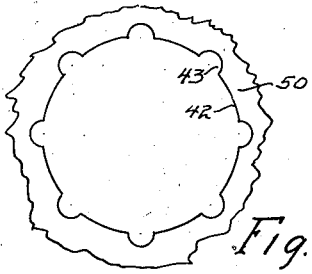
Figs. 10 and 11 are views illustrating steps of the process of constructing the embodiment of Fig. 9.
Figure 10:
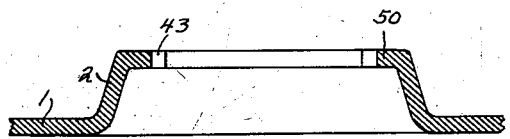

Referring to the modification of Figs. 9, 10, and 11, it is believed that a brief description will suffice in view of the more complete description of the first-described form.

Here again, a protuberance 2 is formed on the wall 1 the bottom 3 of which is again preferably (but as in the first-described form not necessarily), planar, but having as at 15 an outwardly preferably planar annular portion. A perforation 42 is provided in the bottom 3 of the protuberance and the periphery of the perforation has a number of notches or indentations 43—43. A spud body 44 threaded at 45, is made of steel having an annular groove 46 in one face thereof, thereby providing a skirt 47. The skirt 47 is welded to the surface 15 of the protuberance.

The structure thus made is enameled as described for the first form, and an insert 48 is molded into the structure and threaded as at 49 with threads which are a continuation of the threads 45.

The parts, the method of making and assembling them, and the functions of this form, are in general the same as those of the first described form, the principal difference being that the inwardly extending curved flange 6 of the first described form is omitted. Here the portions of the bottom 3 of the protuberance, indicated at 50, and adjacent the periphery of the perforation 42, project inwardly beyond the skirt 47 of the spud proper 44, and overlap a part of the spud groove 46 in the nature of an annular flange which functions to interlock the insert 48 rigidly in the cavity of the structure to prevent its displacement outwardly axially therefrom; and the notches 43 interlock with the insert to prevent its rotational displacement while being threaded or while a conduit is being screwed into or out of it.

Figure 13:
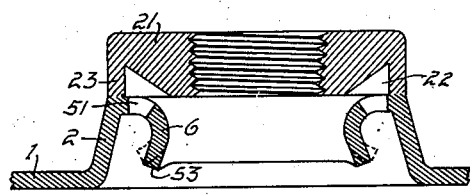
Fig. 13 is a view of the parts of Fig. 12 in the process of making them.
Figure 12:
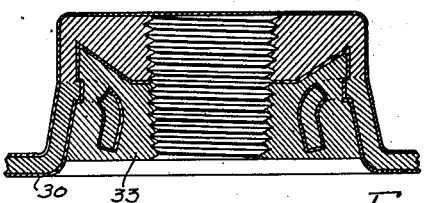
Fig. 12 is a view similar to Fig. 1 illustrating a modification.
Figure 14:
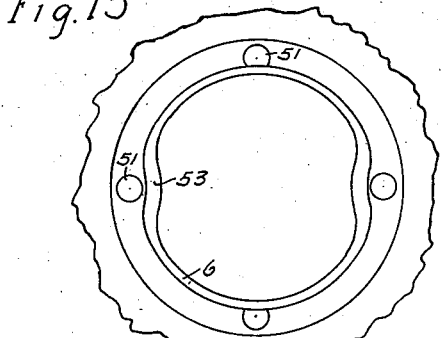
Fig. 14 is a bottom plan view of the parts of Fig. 13.

The modification of Figs. 12, 13, and 14 is generally similar to the form of Fig. 1 with the following differences.

The flange 6 is provided with a plurality of perforations, for example four, shown at 51—51 which, when the skirt 23 of the spud 21 is welded upon the protuberance 2, will lie inwardly of the skirt and communicate with the annular groove 22; and these perforations are to facilitate forming the coat of enamel 30 on the wall of the cavity within the construction. The wet enamel slip when applied on the surfaces to be enameled tends to accumulate in the groove 22 and it is desirable that the coat of slip will be substantially of uniform thickness throughout. By providing the perforations 51, excess wet enamel slip may drain outwardly therethrough from the groove 22.

This modification also provides a different means for interlocking the insert against rotation. In this case the perforations 5—5 of the flange 6 (of Figs. 3, 4, and 5), may be omitted. After the flange is given its curved flaring form by the dies of Fig. 5, and as indicated at 52, Fig. 13, the lower edge of the flange 6 is bent inwardly at one or more points of its periphery, as shown at 53, particularly in Fig. 14. The flaring flange 6 therefore, in its final form, is partly circular and part non-circular, whereby when the insert 33 is molded into position, it is prevented from or interlocked against rotation for the purposes described hereinbefore.

In some cases it may be desirable to provide a spud connection, having the properties and the advantages described hereinbefore, directly upon a wall of the tank and without first providing the protuberance 2, and such constructions are shown in Figs. 16 through 20. It is believed that a brief description of these forms will suffice in view of the more complete descriptions of the preceding forms.

Figure 17:
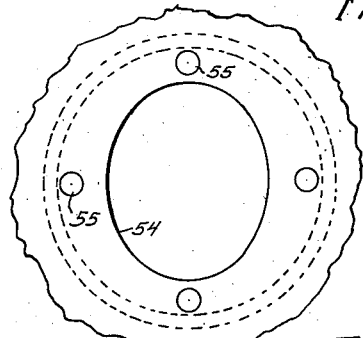
Fig. 17 is a view taken from the plane 17 of Fig. 16.
Figure 16:
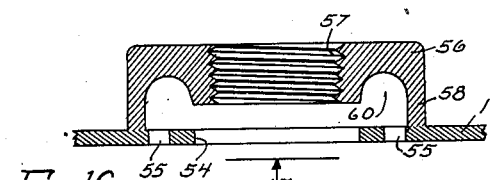
Fig. 16 is a view illustrating one of the process steps of making the embodiment of Fig. 15.
Figure 15:
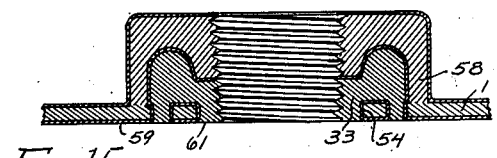
Fig. 15 is a view of an embodiment of the invention in general similar to the embodiment of Fig. 9 but illustrating a modification.

In Fig. 15 is shown one form of such spud connection, Figs. 16 and 17 illustrating it at a preliminary step of construction.

An opening 54 is provided in the tank wall; and the periphery of this opening may have notches cut or punched therein as illustrated for example in Fig. 11 of a preceding form, to interlockingly prevent rotation of the insert, but, as illustrating a further modification, the periphery of the opening 54 is smooth but the opening itself is oval or non-circular as shown in Fig. 17. A plurality of perforations 55 are provided outwardly of the perforation 54.

The steel spud body 56, threaded for a conduit as at 57, has thereon a skirt 58 which is welded directly to the wall 1 of the tank and surrounding the series of perforations 55—55.

A vitreous enamel coat is then applied as shown in Fig. 15, the coat being indicated at 59 on the inner wall of the tank and over the inner wall of the cavity 60 in the spud, and over the portions of the tank wall 1 which surround the opening 54, and over the walls of the perforations 55; and the perforations 55 function to drain the slip as described in connection with the form of Figs. 12 to 14.

A plug not shown is then screwed into the steel spud and the insert 33 is molded into the construction and threaded. (See description of Fig. 8.) In this form the molten insert 33 fills the cavity of the construction to approximately the level of the inner wall of the tank as indicated at 61, and interlocks with the non-circular periphery of the opening 54 to prevent its rotation, and interlocks with the portions of the wall 1 inwardly of the skirt 58 to prevent longitudinal displacement of the insert. Longitudinal thickness of the insert may be made as great as desired by the length axially of the spud skirt 58.

Figure 18:
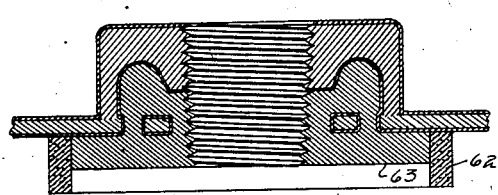
Fig. 18 is a view similar to Fig. 15 illustrating a modification thereof.

The form of Fig. 18 is similar to the form of Fig. 15 except that here greater longitudinal thickness of the insert is provided by means of an annular dam or mold 62 placed as a molding device temporarily in contact with the inner enameled surface of the body 1, so that when the molten insert is poured into the construction, it rises within the dam 62 to a level for example such as that shown at 63. After the insert has solidified, the dam 62 is removed.

Figure 20:
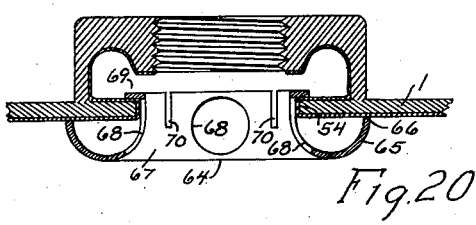
Fig. 20 is a view illustrating the modification of Fig. 19 at a preceding step of the process of making it.
Figure 19:
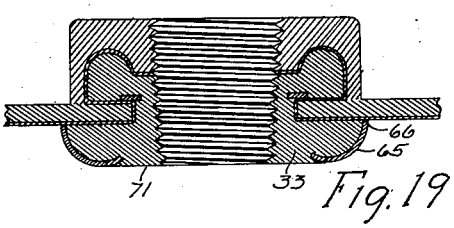
Fig. 19 is a view similar to Fig. 15 illustrating another modification.

The form of Figs. 19 and 20 is also similar to that of Fig. 15 but the longitudinal extent of the insert is increased by a sheet metal molding device shown generally at 64. Fig. 20 illustrates the construction after it has been enameled, and with the sheet metal device 64 in place ready for the insert to be molded in position.

The sheet metal device 64 is generally in the form of an annular channel, with the concave side of the channel toward the opening 54. The outer wall 65 of the channel is continuous annularly and terminates in an annular edge 66. The inner wall 67 of the channel has therein a number of relatively large perforations 68. At its upper edge, the inner wall 67 of the channel has an outwardly extending flange 69 thereon. The flange 69 and adjacent parts of the inner wall 67 are discontinuous annularly, the discontinuity being preferably effected by a number of slots 70—70 which render the upper annular extremity of the inner wall 67 resilient, or at least flexible.

The device 64 is put into the position of Fig. 20 by bending the upper end of the inner wall 67 of the channel inwardly so that it will pass through the opening 54, and then bending it outwardly so that the flange 69 will lie upon and overlap the enamel coat adjacent the periphery of the opening 54.

The shape and proportions of the device 64 are such that the flange 69 will hold the edge 66 firmly against the enameled inner surface of the tank wall 1.

The insert 33 is now poured into the structure as before and it flows through the openings 68, filling the cavity of the structure and the channel of the device, and may rise to the level indicated at 71, Fig. 19. The device 64 will be left in place after solidification of the insert.

In the form of Fig. 21, the spud body 72 is not provided with the groove and skirt of the spuds of the other forms. The body wall 1 is provided with a protuberance 73 extending away from the spud; and the spud body and protuberance are of such diameter that the spud body overlaps the tank body 1 on mutually engaged annular portions at 74 whereat they are welded together. The opening 54 is provided in the bottom 75 of the protuberance; and in order to facilitate forming the parts, the opening may be provided after the protuberance is press-formed in the wall. The bottom 75 of the protuberance may be spaced as far from the spud body as desired whereby the axial extent of the insert 33 may be made as great as wanted. The cavity between the protuberance bottom and the spud body holds the insert against longitudinal displacement and the interlock of the insert with the non-circular periphery of the opening 54 locks it against rotation.

In the modification of Figs. 22 and 23 (which is generally similar to that of Figs. 16 and 15) the wall of the body 1, in the portions 76 thereof adjacent to the perforation 54, are bent toward the spud body 56; and the insert 33 therefore interlocks more rigidly with the structure than in the form of Figs. 22 and 23.

In Fig. 24, a similar bend in the portions 77 makes a like improvement over the form of Fig. 21 to which it is otherwise similar.

It will of course be understood (as referred to in connection with Fig. 8) that at the time of pouring in the molten insert, the parts of all of the forms and modifications above described may be disposed upside down in respect to the positions in which they are illustrated.

While as stated the invention is particularly advantageous in connection with vessels the walls of which are coated with vitreous enamel, it may also be advantageously used with vessels the walls of which are made from non-corrosive metal; or from corrosive metal protected with other kinds of non-corrosive coats.

The invention is not limited to the exact details of construction illustrated and described. Changes and modifications may be made within the spirit of our invention without sacrificing its advantages and within the scope of the appended claims.

We claim:

1. In a conduit connection for a vessel wall having an opening therein, a spud body provided with a tapered conduit thread and welded to the wall of the vessel on a portion thereof surrounding the opening, a projection integral with the wall and spud body projecting inwardly toward the axis of the opening and in spaced overlapping relation to a portion of the spud body, a corrosion-proof coat on the inner wall surface of the vessel, an insert molded to interlock with the projection and to seal the enamel coat with respect to the spud thread, and an opening in the insert having a tapered conduit thread constituting a continuation of the tapered spud thread.

2. In a conduit connection for a vessel wall having an opening therein, a spud body provided with a tapered conduit thread and welded to the wall of the vessel on a portion thereof surrounding the opening, a projection integral with the wall and spud body projecting inwardly toward the axis of the opening and in spaced overlapping relation to a portion of the spud body, a corrosion-proof coat on the inner wall surface of the vessel continuing over the projection and over a portion of the spud body surrounding its thread, an insert molded to interlock with the projection and to seal the enamel coat with respect to the spud thread, and an opening in the insert having tapered conduit thread constituting a continuation of the tapered spud thread.

3. In a conduit connection for a vessel wall having an opening therein, a spud body provided with a tapered conduit thread and welded to the wall of the vessel on a portion thereof surrounding the opening, a flange integral with the wall and spud body projecting inwardly toward and circumscribing the axis of the opening and in spaced overlapping relation to a portion of the spud body, a corrosion-proof coat on the inner wall surface of the vessel, an insert molded to interlock with the flange to prevent bodily displacement of the insert and sealing the enamel coat with respect to the spud thread, and the flange provided with means interlocking with the insert to prevent rotational displacement thereof, and an opening in the insert having a tapered conduit thread constituting a continuation of the tapered spud thread.

4. In a conduit connection for a vessel wall having a perforation in the wall, a taper threaded spud body having a skirt portion welded to the vessel wall on portions thereof surrounding and spaced outwardly from the periphery of the opening, the wall on portions thereof more adjacent the opening projecting toward the axis of the spud thread in the form of a flange the flange being spaced axially from the spud body, an insert molded to interlock with the flange and having an opening therein provided with a taper thread constituting a continuation of the tapered spud thread.

5. In a conduit connection for a vessel wall having a perforation in the wall, a taper threaded spud body having a tubular skirt welded to the vessel wall on annular portions thereof surrounding and spaced outwardly radially from the periphery of the opening, the wall on portions thereof more adjacent the opening projecting toward the axis of the spud thread in the form of a flange the flange being axially spaced from the spud body, an insert molded to interlock with the flange and the flange being formed to prevent axial and rotational displacement of the insert, and the insert having an opening therethrough provided with a taper thread constituting a continuation of the tapered spud thread.

6. In a conduit connection for a vessel having a perforation in the wall, a taper threaded spud body welded to the vessel wall on annular portions thereof surrounding and spaced outwardly radially from the periphery of the opening, the wall on portions thereof more adjacent to the opening projecting toward the axis of the spud thread in the form of a flange; the flange being spaced axially from the spud body and having a perforation therein, an insert molded to interlock with the flange and having an opening therein provided with a tapered thread constituting a continuation of the tapered spud thread.

7. A conduit connection for a vessel wall, comprising a generally tubular protuberance on the wall of the vessel surrounding an opening in the wall; a taper screw threaded spud body on the tubular protuberance; a projection extending inwardly from the wall of the tubular protuberance; and an insert molded in the tubular protuberance and interlocked with the projection and having a tapered thread constituting a continuation of the tapered spud thread.

8. A conduit connection for a vessel wall comprising a tubular protuberance on the wall surrounding an opening in the wall; a taper screw threaded spud welded to an annular portion of the protuberance intermediate its end portion and the tank wall; the end portion of the tubular protuberance projecting generally toward its axis in the form a flange; an insert molded in the protuberance and over the flange, and having a tapered thread constituting a continuation of the tapered spud thread.

9. A conduit connection for a vessel wall comprising a tubular protuberance on the wall surrounding an opening therein; the end portion of the protuberance projecting generally toward its axis in the form of a flange; a taper threaded spud body spaced from the flange and welded to the vessel wall; an insert molded in the protuberance and between the flange and spud body; and a tapered thread constituting the insert in continuaation of the tapered spud thread.

10. A conduit connection for a vessel wall, comprising a generally tubular protuberance on the wall of the vessel surrounding an opening in the wall; a taper screw threaded spud body on the tubular protuberance; the tubular protuberance comprising a portion extending inwardly toward the axis of the screw thread; and an insert molded in the tubular protuberance and interlocked with the inwardly projecting portion and having a tapered thread constituting a continuation of the tapered spud thread.

STEPHEN T. BODNAR.
WALTER S. GAINES.

CERTIFICATE OF CORRECTION.

Patent No. 2,362,983. November 21, 1944.

STEPHEN T. BODNAR, ET AL.

It is hereby certified that error appears in the printed specification of the above numbered patent requiring correction as follows: Page 6, second column, lines 12 and 13, claim 9, for the words "constituting the insert in continuaation" read --in the insert constituting a continuation--; and that the said Letters Patent should be read with this correction therein that the same may conform to the record of the case in the Patent Office.

Signed and sealed this 20th day of February, A. D. 1945.

Leslie Frazer (Seal)　　　　　　　　　　Acting Commissioner of Patents.